Miner & Merrick,
Nut Lock.
No. 105,357. Patented July 12, 1870.
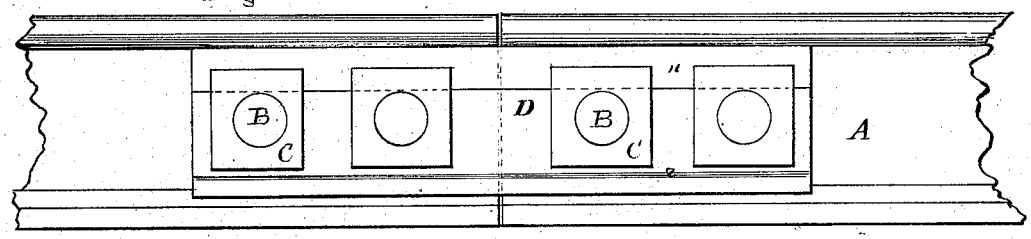
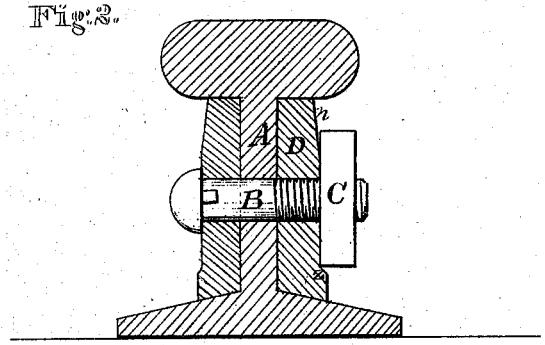
Witnesses
Q. Q. Kane
Chas Kenyon
Inventors
John Miner
Silas Merrick
Chipman Hosmer & Co
Attorneys

United States Patent Office.

JOHN MINER AND SILAS MERRICK, OF NEW BRIGHTON, PENNSYLVANIA.

Letters Patent No. 105,357, dated July 12, 1870.

IMPROVEMENT IN RAILWAY SPLICE AND NUT-LOCK.

The Schedule referred to in these Letters Patent and making part of the same.

*To all whom it may concern:*

Be it known that we, JOHN MINER and SILAS MERRICK, of New Brighton, in the county of Beaver and State of Pennsylvania, have invented a new and valuable Improvement in Fish-Plates for Railroads; and we do hereby declare that the following is a full, clear, and exact description of the construction and operation of the same, reference being had to the annexed drawing making a part of this specification, and to the letters and figures of reference marked thereon.

Figure 1 of the drawing is a side view of our invention.

Figure 2 is a vertical transverse section of the same.

Our invention relates to means for preventing the nuts which secure the bolts of the fish-plates of railroad rails from working loose, and consists in rolling the fish-plate with a raised ledge or rib below the bolt-hole, and a depressed inclination above the same, whereby the ordinary nut is readily and securely locked by the fish-plate itself.

The letter A of the drawing represents the rail;

B, the screw-bolt;

C, the nut; and

D, the locking fish-plate.

The raised portion of the fish-plate is shown at $z$. It is connected with the face of the plate by an inclined plane, over which the corner of the nut passes in turning. The rise of the plate commences at a little distance from the lower edge of the nut. When the nut is screwed up closely, its position will be inclined in passing over the rise, and, in order to allow for this inclination, and to facilitate it as much as possible, the upper edge of the fish-plate is beveled from the edge of the bolt-hole at $n$.

After the corner of the nut has been sprung over the rise of the plate, its under surface again comes fully in contact with the face of the fish-plate, and the rise acts effectually in preventing the nut from turning in the reverse direction, when jarred by a prssing train.

It is obvious that the rise of the fish-plate may be arranged above the nut, and the beveled edge thereof below, with the same result.

We are aware that a concave fish-plate has been used in connection with a nut having a convex under surface, designed to accomplish the result effected by our invention. In such a plate no allowance is made for the spring, the nut rising equally at the opposite corners.

In our invention, the ordinary flat-bottomed nuts can be used.

What we claim as our invention, and desire to secure by Letters Patent, is—

The fish-plate herein described, having the raised portion or ledge $z$, and the beveled edge $n$, on opposites of the bolt-holes, as and for the purposes specified.

In testimony that we claim the above, we have hereunto subscribed our names in the presence of two witnesses.

JOHN MINER.
SILAS MERRICK.

Witnesses:
CHAS. HOOPES,
R. E. HOOPES.